(12) United States Patent
  Tanaka (10) Patent No.: US 11,043,658 B2
(45) Date of Patent: Jun. 22, 2021

(54) ELECTRODE SHEET MANUFACTURING DEVICE

(71) Applicant: TOYOTA JIDOSHA KABUSHIKI KAISHA, Toyota (JP)

(72) Inventor: Yukiko Tanaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/592,887

(22) Filed: Oct. 4, 2019

(65) Prior Publication Data

US 2020/0168889 A1 May 28, 2020

(30) Foreign Application Priority Data

Nov. 26, 2018 (JP) .............................. JP2018-220048

(51) Int. Cl.
| | |
|---|---|
| *H01M 4/04* | (2006.01) |
| *H01M 4/139* | (2010.01) |
| *H01M 10/0525* | (2010.01) |
| *B29C 43/28* | (2006.01) |
| *B29C 43/46* | (2006.01) |
| *B29C 43/24* | (2006.01) |

(Continued)

(52) U.S. Cl.
CPC .......... *H01M 4/0404* (2013.01); *B29C 43/24* (2013.01); *B29C 43/28* (2013.01); *B29C 43/46* (2013.01); *H01M 4/0435* (2013.01); *H01M 4/139* (2013.01); *H01M 10/0525* (2013.01); *B29C 2043/461* (2013.01); *B29K 2705/10* (2013.01); *B29L 2031/3406* (2013.01)

(58) Field of Classification Search
CPC .............. H01M 4/0435; H01M 4/0404; B29C 2043/461; B29C 43/46; B05D 1/007; B05D 1/28; B05C 19/00; B05C 19/002
USPC .................................... 118/212, 624; 427/58
See application file for complete search history.

(56) References Cited

U.S. PATENT DOCUMENTS

| | | | | |
|---|---|---|---|---|
| 3,296,965 | A | * | 1/1967 | Reif .......................... B41M 1/42 101/170 |
| 4,060,648 | A | * | 11/1977 | Taylor-Brown .......... B05B 5/14 427/482 |

(Continued)

FOREIGN PATENT DOCUMENTS

| | | |
|---|---|---|
| JP | 2013-077560 A | 4/2013 |
| JP | 2015-201318 A | 11/2015 |

(Continued)

*Primary Examiner* — Robert B Davis
(74) *Attorney, Agent, or Firm* — Sughrue Mion, PLLC (57) ABSTRACT

In an electrode sheet manufacturing device, in a state where an electric potential difference is generated between a gravure roll and a current collecting foil conveyed by a backup roll, a powder mixture made as powder of an electrode active material and powder of a binder are mixed without a solvent is continuously fed into a depressed portion on an outer peripheral surface of the gravure roll, and an electric potential difference is generated between the powder mixture fed into the depressed portion of the gravure roll, and the current collecting foil. Due to electrostatic force acting between the powder mixture and the current collecting foil, the powder mixture is moved from the gravure roll to a surface of the current collecting foil. Circumferential speed of the gravure roll is higher than circumferential speed of the backup roll.

3 Claims, 4 Drawing Sheets

(51) Int. Cl.
    *B29K 705/10*    (2006.01)
    *B29L 31/34*     (2006.01)

(56) References Cited

U.S. PATENT DOCUMENTS

| | | | |
|---|---|---|---|
| 4,715,918 A * | 12/1987 | Lang | A61F 13/15634 |
| | | | 156/273.1 |
| 2014/0342225 A1 | 11/2014 | Isshiki et al. | |
| 2016/0118642 A1 | 4/2016 | Enokihara | |
| 2016/0181651 A1 | 6/2016 | Tanihara et al. | |
| 2019/0140254 A1* | 5/2019 | Kim | H01M 4/621 |
| 2020/0185782 A1* | 6/2020 | Tanaka | H01M 4/0404 |
| 2020/0227722 A1* | 7/2020 | Bogenstahl | H01G 13/02 |
| 2020/0295353 A1* | 9/2020 | Tanaka | H01M 4/0435 |

FOREIGN PATENT DOCUMENTS

| | | |
|---|---|---|
| JP | 2016-081871 A | 5/2016 |
| JP | 2016-119207 A | 6/2016 |

\* cited by examiner

ELECTRODE SHEET MANUFACTURING DEVICE

INCORPORATION BY REFERENCE

The disclosure of Japanese Patent Application No. 2018-220048 filed on Nov. 26, 2018 including the specification, drawings and abstract is incorporated herein by reference in its entirety.

BACKGROUND

1. Technical Field

The disclosure relates to a device that manufactures an electrode sheet included in a battery (an electrode sheet manufacturing device). More specifically, the disclosure relates to a device that manufactures an electrode sheet having a structure in which an electrode mixture layer is formed on a surface of a current collecting foil.

2. Description of Related Art

Conventionally, as an electrode sheet, there is a known electrode sheet having a structure in which an electrode mixture layer is formed on a surface of a current collecting foil. As a method for manufacturing an electrode sheet having this kind of structure, the methods disclosed in, for example, Japanese Unexamined Patent Application Publication No. 2013-77560 (JP 2013-77560 A) and Japanese Unexamined Patent Application Publication No. 2015-201318 (JP 2015-201318 A) are known. Specifically, first of all, an electrode mixture is fabricated. The electrode mixture is made of a plurality of wet granules that is made by granulating a mixture of electrode active material particles, a binding material, and a solvent. Next, the electrode mixture is made to pass through a gap between a pair of rolls facing each other, and the electrode mixture is thus made membranous while being compressed. Then, the membranous electrode mixture is adhered onto a surface of the current collecting foil. Thus, the current collecting foil with the membranous electrode mixture in which the membranous electrode mixture is present on a surface of the current collecting foil is fabricated.

More specifically, the electrode mixture is made to pass through the gap between a second roll and a first roll. The second roll is used to transfer the electrode mixture to the current collecting foil, and the second roll faces the first roll. Thus, the electrode mixture is made into a membranous state while being compressed, and the membranous electrode mixture is adhered to the second roll. Thereafter, the membranous electrode mixture adhered on the second roll is transferred (adhered) onto a surface of the current collecting foil. Then, the membranous electrode mixture adhered on the surface of the current collecting foil is dried, and an electrode mixture layer is thus formed on the surface of the current collecting foil.

SUMMARY

In the foregoing manufacturing method, the electrode mixture is used that is made of the wet granules made by granulating the mixture of the electrode active material particles, the binding material, and the solvent. Therefore, it is necessary to have a drying process in which the electrode mixture is dried so as to remove the solvent. Therefore, in the foregoing manufacturing method, manufacturing time becomes long and cost increases. Further, the solvent eventually becomes unnecessary for the electrode mixture layer of the electrode sheet. Therefore, a device has been demanded that is able to manufacture the electrode sheet appropriately without use of the solvent.

The disclosure has been accomplished in view of these current situations, and an object of the disclosure is to provide an electrode sheet manufacturing device that is able to appropriately form an electrode mixture layer on a surface of a current collecting foil without the use of a solvent.

An aspect of the disclosure is an electrode sheet manufacturing device that manufactures an electrode sheet in which an electrode mixture layer containing an electrode active material and a binder is provided on a surface of a current collecting foil. The electrode sheet manufacturing device includes a gravure roll and a backup roll. The gravure roll has an uneven-shaped outer peripheral surface and rotates. The backup roll rotates while facing the gravure roll through a gap from the gravure roll and allows the current collecting foil to pass through the gap so that the backup roll conveys the current collecting foil. In a state where an electric potential difference is generated between the gravure roll and the current collecting foil conveyed by the backup roll, a powder mixture is continuously fed into a depressed portion of the outer peripheral surface of the gravure roll. The powder mixture is made as powder of the electrode active material and powder of the binder are mixed without a solvent. An electric potential difference is thus generated between the powder mixture fed into the depressed portion of the gravure roll and the current collecting foil, and the powder mixture is moved onto the surface of the current collecting foil from the gravure roll due to electrostatic force acting between the powder mixture and the current collecting foil. Then, the powder mixture is continuously arranged on the surface of the current collecting foil that is conveyed by the backup roll. The electrode sheet manufacturing device is characterized in that the powder mixture is continuously fed into the depressed portion of the gravure roll in a state where circumferential speed of the gravure roll is set to be higher than circumferential speed of the backup roll.

The above-mentioned electrode sheet manufacturing device is a device that manufactures an electrode sheet in which the electrode mixture layer containing the electrode active material and the binder is provided on the surface of the current collecting foil. The electrode sheet manufacturing device includes the gravure roll and the backup roll that rotate while facing each other through a gap. The gravure roll is a roll having the uneven-shaped outer peripheral surface. The backup roll is a roll that rotates while facing the gravure roll through the gap from the gravure roll, and allows the current collecting foil to pass through the gap between the backup roll and the gravure roll so that the backup roll conveys the current collecting foil.

Further, the above-mentioned electrode sheet manufacturing device has a configuration in which the powder mixture is continuously fed into the depressed portion of the outer peripheral surface of the gravure roll in a state where an electric potential difference is generated between the gravure roll and the current collecting foil conveyed by the backup roll. The powder mixture is made as the powder of the electrode active material and the powder of the binder are mixed without a solvent. Then, an electric potential difference is thus generated between the powder mixture fed into the depressed portion of the gravure roll and the current collecting foil that is conveyed, and the powder mixture is moved (made to jump) onto the surface of the current collecting foil from the gravure roll due to electrostatic force acting between the powder mixture and the current collecting foil. Thus, the powder mixture is continuously arranged on the surface of the current collecting foil that is conveyed by the backup roll. Therefore, with the electrode sheet manufacturing device described above, it is possible to form the electrode mixture layer containing the electrode active material and the binder on the surface of the current collecting foil without the use of a solvent.

In a battery (for example, a lithium ion secondary battery) that is used as a driving power source for a hybrid vehicle or an electric vehicle, and so on, in order to improve a capacity density of the battery, it is required to increase a base weight (a weight per unit area, $mg/cm^2$) of the electrode mixture layer provided on the surface of the current collecting foil. Therefore, when the electrode sheet is manufactured with use of the electrode sheet manufacturing device described above, it is required to increase a base weight ($mg/cm^2$) of the powder mixture arranged on the surface of the current collecting foil.

On the contrary, with the electrode sheet manufacturing device described above, the powder mixture is continuously fed into the depressed portion of the gravure roll in a state where the circumferential speed of the gravure roll (moving speed of the outer peripheral surface of the gravure roll in its circumferential direction due to rotation) is higher than the circumferential speed of the backup roll (moving speed of the outer peripheral surface of the backup roll in its circumferential direction due to rotation).

By doing so, in comparison to a case where the circumferential speed of the gravure roll and the circumferential speed of the backup roll are equal to each other, it is possible to feed a larger amount of the powder mixture onto the surface of the current collecting foil from the gravure roll per a unit length of the current collecting foil that is conveyed by the backup roll. This means that, as the circumferential speed of the gravure roll is made higher than the circumferential speed of the backup roll, it is possible to have a larger base weight ($mg/cm^2$) of the powder mixture arranged on the surface of the current collecting foil in comparison to that in the case where the circumferential speed of the gravure roll and the circumferential speed of the backup roll are equal to each other. Thus, with the foregoing electrode sheet manufacturing device, it is possible to increase the base weight ($mg/cm^2$) of the electrode mixture layer provided on the surface of the current collecting foil.

As another method for increasing the base weight ($mg/cm^2$) of the powder mixture arranged on the surface of the current collecting foil, an amount of the powder mixture fed onto the surface of the current collecting foil from the gravure roll may be increased at once in the state where the circumferential speed of the gravure roll and the circumferential speed of the backup roll are equal to each other. However, there is a limit of an amount of the powder mixture that can be moved (made to jump) to the surface of the current collecting foil at once from the gravure roll. Therefore, there is a possibility that the base weight ($mg/cm^2$) of the powder mixture arranged on the surface of the current collecting foil cannot be increased appropriately.

Specifically, for example, a method is considered in which an amount of the powder mixture fed onto the surface of the current collecting foil from the gravure roll can be increased by increasing a depth of the depressed portion of the gravure roll so that the amount of the powder mixture filled in the depressed portion of the gravure roll is increased even when the circumferential speed of the gravure roll and the circumferential speed of the backup roll are equal to each other.

However, with this method, a distance between a bottom surface of the depressed portion of the gravure roll and the surface of the current collecting foil conveyed by the backup roll becomes long, and the electrostatic force acting between the powder mixture located in the depressed portion of the gravure roll on the bottom surface side and the current collecting foil thus becomes weak. Due to this, there is a possibility that the powder mixture located in the depressed portion of the gravure roll on the bottom surface side cannot be moved (made to jump) onto the surface of the current collecting foil. Hence, the base weight ($mg/cm^2$) of the powder mixture arranged on the surface of the current collecting foil may not be increased appropriately.

Further, the depressed portion of the gravure roll may be in any form. As an example of the form of the depressed portion, dimple-shaped depressed portions may be arranged regularly on the outer peripheral surface of the gravure roll. Alternatively, linear-shaped depressed portions may be formed regularly at equal intervals on the outer peripheral surface of the gravure roll.

In the foregoing electrode sheet manufacturing device, a pair of hot rolls may be provided. The hot rolls rotate while facing each other through a gap. With the foregoing electrode sheet manufacturing device, the electrode mixture layer containing the electrode active material and the binder may be adhered onto the surface of the current collecting foil as the current collecting foil on which the powder mixture is arranged is made to pass through the gap between the hot rolls so that the powder mixture and the current collecting foil are brought into pressure contact with each other while the binder contained in the powder mixture is being softened or melted.

In the above-mentioned electrode sheet manufacturing device, the current collecting foil on which the powder mixture is arranged is made to pass through the gap between the hot rolls that rotate while facing each other. Thus, the powder mixture and the current collecting foil are brought into pressure contact with each other while the binder contained in the powder mixture is being softened or melted. Because of this, the powder mixture arranged on the surface of the current collecting foil becomes the electrode mixture layer containing the electrode active material and the binder, and is adhered to the surface of the current collecting foil through the binder. Thus, the electrode sheet is manufactured in which the electrode mixture layer containing the electrode active material and the binder without a solvent is adhered onto the surface of the current collecting foil. As described so far, with the manufacturing device described above, it is possible to appropriately form the electrode mixture layer on the surface of the current collecting foil without the use of a solvent.

Further, in the electrode sheet manufacturing device described above, a nip roll may be provided. The nip roll may be positioned on a downstream side from the backup roll and on an upstream side from the hot rolls in a conveyance direction of the current collecting foil. The nip roll may level the powder mixture arranged on the surface of the current collecting foil.

The above-mentioned electrode sheet manufacturing device includes the nip roll that is positioned on the downstream side from the backup roll and on the upstream side from the hot rolls in the conveyance direction of the current collecting foil. The nip roll levels the powder mixture arranged on the surface of the current collecting foil. Therefore, with the above-mentioned electrode sheet manufacturing device, the powder mixture arranged on the surface of the current collecting foil can be leveled before the current collecting foil on which the powder mixture is arranged is made to pass through the gap between the hot rolls. Thus, it is possible to reduce variation of a thickness of the electrode mixture layer formed on the surface of the current collecting foil.

Only one nip roll may be arranged at a position adjacent to the outer peripheral surfaces of the hot rolls on the upstream side in the conveyance direction of the current collecting foil with respect to a position where the current collecting foil on which the powder mixture is arranged is sandwiched between the hot rolls so that the powder mixture and the current collecting foil are brought into pressure contact with each other, and so that a gap is provided between the outer peripheral surface of one of the hot rolls (referred to as a first hot roll) and the outer peripheral surface of the nip roll (a gap smaller than the sum of a thickness of the current collecting foil and a thickness (a height) of the powder mixture arranged on the surface of the current collecting foil). Thus, as the current collecting foil on which the powder mixture is arranged passes through the gap between the nip roll and the first hot roll, it is possible to level the powder mixture arranged on the surface of the current collecting foil.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

Figure 6:
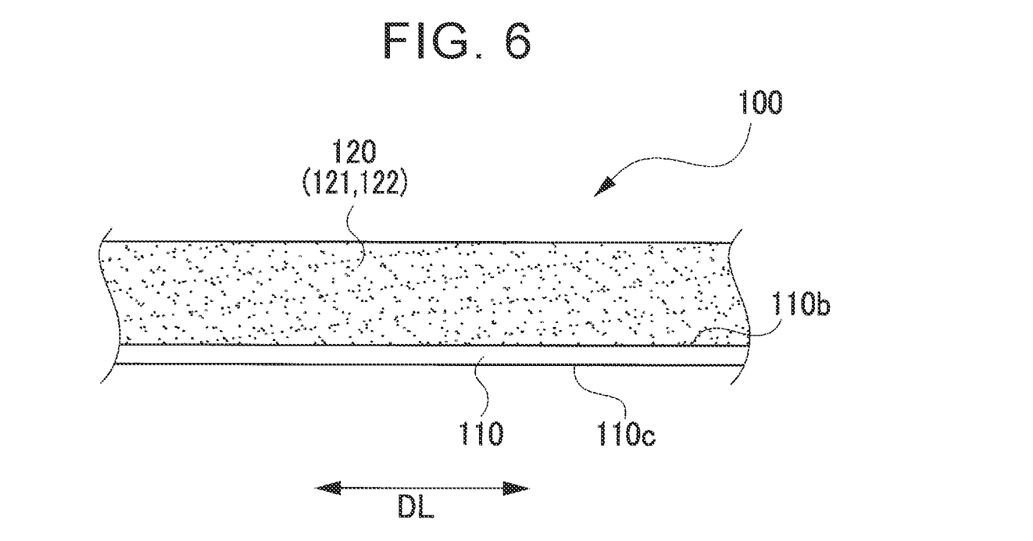
FIG. 6 is an enlarged view of a portion G in FIG. 1 and is an enlarged side view of an electrode sheet according to the embodiment.

Hereinafter, an embodiment of the disclosure in which the disclosure is embodied is described in detail with reference to the drawings. In this embodiment, the disclosure is applied to manufacturing of a negative electrode sheet of a lithium ion secondary battery. This means that, in this embodiment, a manufacturing device for the negative electrode sheet is described as an example of an electrode sheet manufacturing device. In this embodiment, a negative electrode sheet 100 (an electrode sheet) including a current collecting foil 110 and a negative electrode mixture layer 120 (an electrode mixture layer) is manufactured. The negative electrode mixture layer 120 is formed on a surface of the current collecting foil 110 (a first surface 110b) (see FIG. 6).

Figure 1:
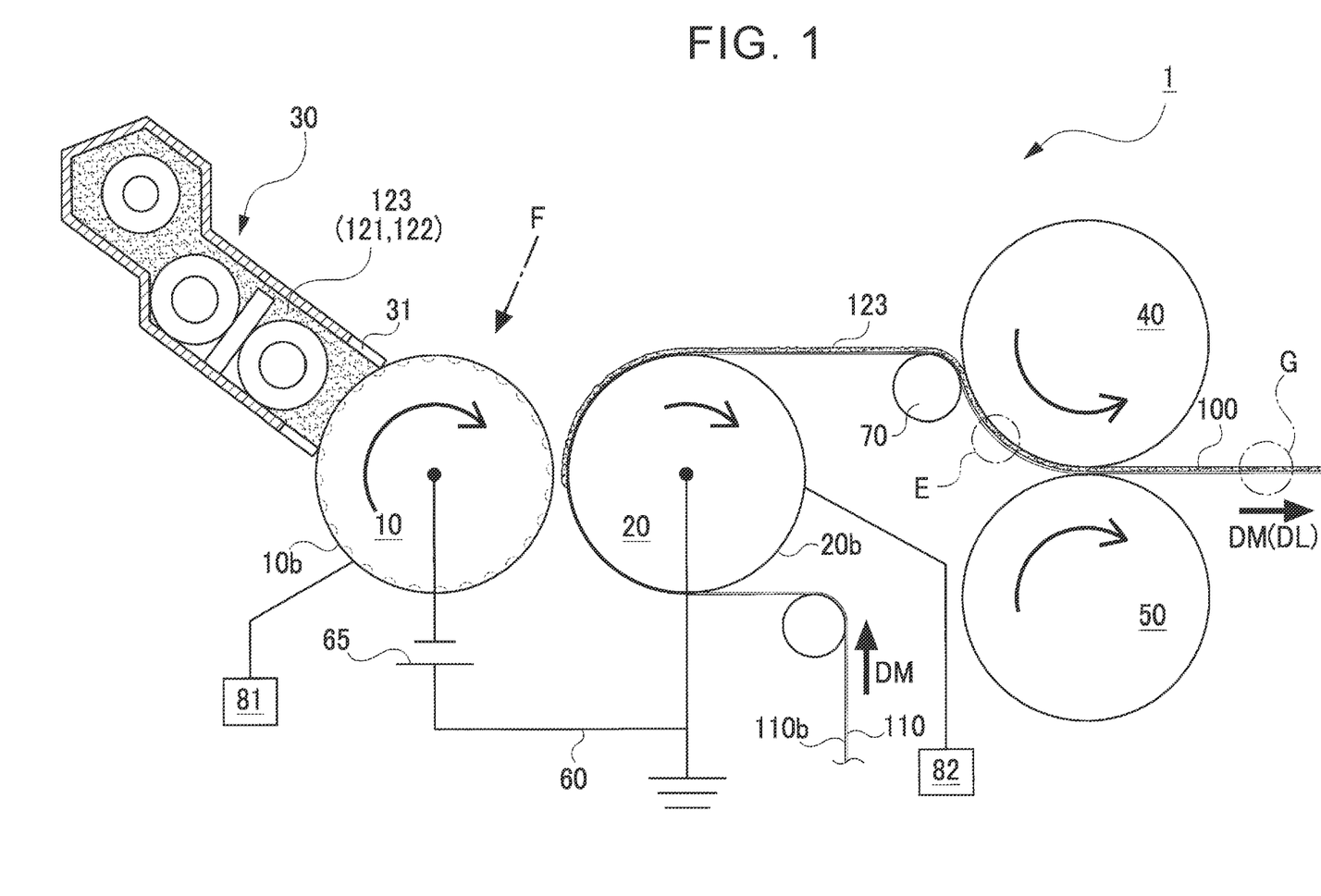
FIG. 1 is a schematic view of an electrode sheet manufacturing device according to an embodiment.

An electrode sheet manufacturing device 1 according to this embodiment is described. In this embodiment, the negative electrode sheet 100 (the electrode sheet) is fabricated with use of the electrode sheet manufacturing device 1. FIG. 1 is a schematic side view of the electrode sheet manufacturing device 1 according to the embodiment. As shown in FIG. 1, the electrode sheet manufacturing device 1 includes a gravure roll 10 and a backup roll 20 that rotate while facing each other, a powder mixture feeding device 30, a first hot roll 40 and a second hot roll 50 (a pair of hot rolls) that rotate while facing each other, a nip roll 70, a first control device 81 that controls rotation (circumferential speed) of the gravure roll 10, and a second control device 82 that controls rotation (circumferential speed) of the backup roll 20.

Of them, the gravure roll 10 and the backup roll 20 are arranged so as to face each other in a horizontal direction (a right-left direction in FIG. 1). The gravure roll 10 and the backup roll 20 face each other through a minute gap. Also, as shown by arrows in FIG. 1, the gravure roll 10 and the backup roll 20 rotate about central axes (not shown), respectively, so that the two rolls have the same rotation direction (the clockwise direction in FIG. 1). In the electrode sheet manufacturing device 1 according to this embodiment, the current collecting foil 110 is made to pass through the gap between the gravure roll 10 and the backup roll 20 so that the current collecting foil 110 is transferred in a conveyance direction DM by the backup roll 20 and so on (see FIG. 1). The conveyance direction DM coincides with a longitudinal direction DL of the current collecting foil 110 (see FIG. 6).

To be specific, the current collecting foil 110 is hung on an outer peripheral surface 20b of the backup roll 20. The current collecting foil 110 is a metal foil (a copper foil). As the backup roll 20 rotates, the current collecting foil 110 passes through the gap in a location where the gravure roll 10 and the backup roll 20 face each other, and is conveyed from lower right to upper right of the backup roll 20. In the location where the gravure roll 10 and the backup roll 20 face each other, in the state where the current collecting foil 110 is made to pass through the gap, there is still a small gap between the gravure roll 10 and the current collecting foil 110. This means that the gap between the gravure roll 10 and the backup roll 20 (the gap in a state where the current collecting foil 110 is not present) is wider than a thickness of the current collecting foil 110.

Figure 2:
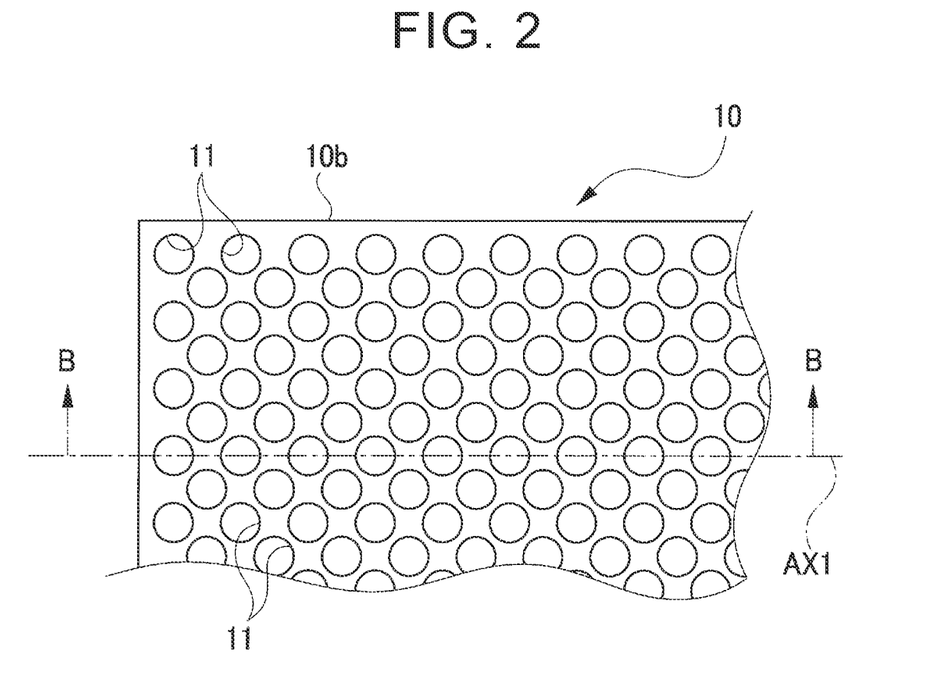
FIG. 2 is an enlarged view of an outer peripheral surface of a gravure roll included in the electrode sheet manufacturing device.
Figure 3:
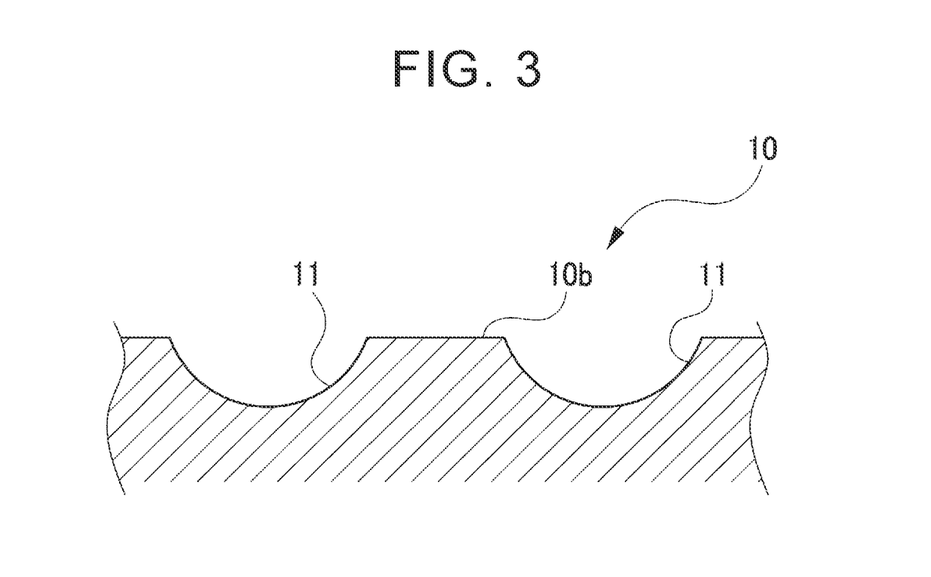
FIG. 3 is an enlarged view of a section taken along the line B-B in FIG. 2.

Further, as shown in FIG. 2 and FIG. 3, the gravure roll 10 has an outer peripheral surface 10b having an uneven shape. Specifically, on the outer peripheral surface 10b of the gravure roll 10, a number of dimple-shaped depressed portions 11 are formed. To be more specific, the gravure roll 10 is a gravure roll having a form (a pattern) in which the depressed portions 11 each having a dimple shape with a given volume are arranged on the outer peripheral surface 10b with regularity. FIG. 2 is an enlarged view of a part of the outer peripheral surface 10b of the gravure roll 10. AX1 in FIG. 2 is a central axis line of the gravure roll 10. Further, FIG. 3 is a sectional view taken along the line B-B in FIG. 2, and is an enlarged sectional view of the gravure roll 10 (a sectional view of the gravure roll 10 taken in a radial direction at a position passing the central axis line AX1).

Also, the powder mixture feeding device 30 is a device that continuously feeds the powder mixture 123 onto the outer peripheral surface 10b of the gravure roll 10. Specifically, the powder mixture feeding device 30 continuously feeds the powder mixture 123 into the depressed portions 11 on the outer peripheral surface 10b of the gravure roll 10 so that the depressed portions 11 on the outer peripheral surface 10b of the gravure roll 10 are filled with the powder mixture 123.

Figure 4:
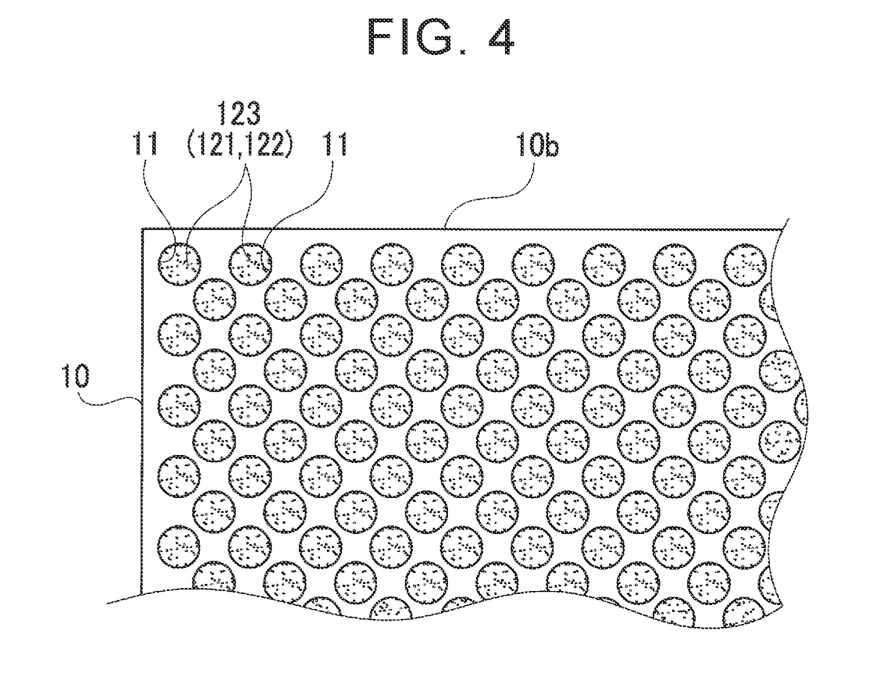
FIG. 4 is an enlarged view in an F direction in FIG. 1.

A doctor blade 31 is provided in the powder mixture feeding device 30 on its distal end side. With the doctor blade 31, the powder mixture feeding device 30 feeds the powder mixture 123 into the depressed portions 11 on the outer peripheral surface 10b of the gravure roll 10 appropriately while scraping the powder mixture 123 that is excessively fed (arranged) onto the outer peripheral surface 10b of the gravure roll 10 (see FIG. 4). This means that, in this embodiment, the powder mixture 123 is arranged only inside the depressed portions 11 on the outer peripheral surface 10b of the gravure roll 10 (see FIG. 4). FIG. 4 is an enlarged view of a portion seen in an F direction in FIG. 1.

The powder mixture 123 used in this embodiment is made without a solvent by mixing powder of a negative electrode active material 121 (an electrode active material) and powder of the binder 122. In this embodiment, as the powder of the negative electrode active material 121, graphite powder is used. As the powder of the binder 122, PVdF powder is used. Further, in this embodiment, the powder of the negative electrode active material 121 and the powder of the binder 122 are mixed with a weight ratio of 95:5. Thus, the powder mixture 123 is made.

In this embodiment, High Speed Mixer (manufactured by Earthtechnica. Co., Ltd.) is used to mix the powder of the negative electrode active material 121 and the powder of the binder 122 so that the powder mixture 123 is fabricated. The powder mixture 123 is made of composite particles in which particles of the negative electrode active material 121 and particles of the binder 122 are compounded (composite particles in a form in which the particles of the binder 122 are bonded to surfaces of the particles of the negative electrode active material 121). This means that the powder mixture 123 used in this embodiment has a number of composite particles. In this embodiment, rotation speed of the High Speed Mixer is set to 4000 rpm, and mixing time is set to one minute to fabricate the powder mixture 123.

Further, with the electrode sheet manufacturing device 1 according to the embodiment, an electric circuit 60 having a power source 65 (see FIG. 1) generates an electric potential difference between the gravure roll 10 and the backup roll 20. Due to this, an electric potential difference is generated between the powder mixture 123 arranged inside the depressed portions 11 on the outer peripheral surface 10b of the gravure roll 10, and the current collecting foil 110 that comes into contact with the outer peripheral surface 20b of the backup roll 20 and conveyed. Therefore, electrostatic force acts between the powder mixture 123 and the current collecting foil 110. Hence, the electric circuit 60 functions as an electric potential difference generator that generates the electric potential difference between the gravure roll 10 (also the powder mixture 123 arranged inside the depressed portions 11 on the gravure roll 10) and the backup roll 20 (also the current collecting foil 110 conveyed by the backup roll 20).

The current collecting foil 110 is held by the backup roll 20, the nip roll 70, the first hot roll 40, the second hot roll 50, and so on in a state where tension is applied to the current collecting foil 110 in the longitudinal direction DL of the current collecting foil 110 (the direction that coincides with the conveyance direction DM). Meanwhile, the powder mixture 123 is simply arranged inside the depressed portions 11 on the outer peripheral surface 10b of the gravure roll 10. Therefore, due to the electrostatic force acting between the powder mixture 123 and the current collecting foil 110, the powder mixture 123 moves (jumps) from the outer peripheral surface 10b of the gravure roll 10 towards the surface (the first surface 110b) of the current collecting foil 110.

Therefore, in this embodiment, in the state where the electric potential difference is generated between the gravure roll 10 and the current collecting foil 110 conveyed by the backup roll 20, the powder mixture 123 is continuously fed into the depressed portions 11 on the outer peripheral surface 10b of the gravure roll 10, and the electric potential difference is generated between the powder mixture 123 fed into the depressed portions 11 of the gravure roll 10 and the current collecting foil 110. Thus, the electrostatic force acts between the powder mixture 123 and the current collecting foil 110. Due to the electrostatic force, the powder mixture 123 (aggregates of the powder mixture 123 filled inside the depressed portions 11) is moved (made to jump) onto the surface (the first surface 110b) of the current collecting foil 110 from the outer peripheral surface 10b of the gravure roll 10. Thus, it is possible to arrange the powder mixture 123 (the aggregates of the powder mixture 123) continuously onto the surface (the first surface 110b) of the current collecting foil 110 that is conveyed by the backup roll 20.

Further, the nip roll 70 is a heat-resistant nip roll 70 and arranged so as to face the first hot roll 40. The nip roll 70 is located at a position on a downstream side of the backup roll 20 in the conveyance direction DM of the current collecting foil 110, and also at a position on an upstream side from the hot rolls (the first hot roll 40 and the second hot roll 50) (specifically, a position on the upstream side of a position where the current collecting foil 110 on which the powder mixture 123 is arranged is sandwiched between the hot rolls and the current collecting foil 110 and the powder mixture 123 are brought into pressure contact with each other) (see FIG. 1). An outer peripheral surface of the nip roll 70 and an outer peripheral surface of the first hot roll 40 face each other through a minute gap. The current collecting foil 110 on which the powder mixture 123 is arranged is made to pass through the gap at a location where the outer peripheral surface of the nip roll 70 and the outer peripheral surface of the first hot roll 40 face each other.

A dimension of the gap at the location where the nip roll 70 and the first hot roll 40 face each other is larger than the thickness of the current collecting foil 110, and is smaller than the sum of the thickness of the current collecting foil 110 and a thickness (a maximum thickness) of the powder mixture 123 arranged on the first surface 110b of the current collecting foil 110. Thus, as the current collecting foil 110 on which the powder mixture 123 (the aggregates of the powder mixture 123 or the aggregates in a layer shape) is arranged passes through the gap at the location where the nip roll 70 and the first hot roll 40 face each other, the powder mixture 123 (the aggregates of the powder mixture 123 or the aggregates in a layer shape) is leveled on the first surface 110b of the current collecting foil 110, and becomes a layer having a generally constant thickness (referred to as a powder mixture layer 127).

Figure 5:
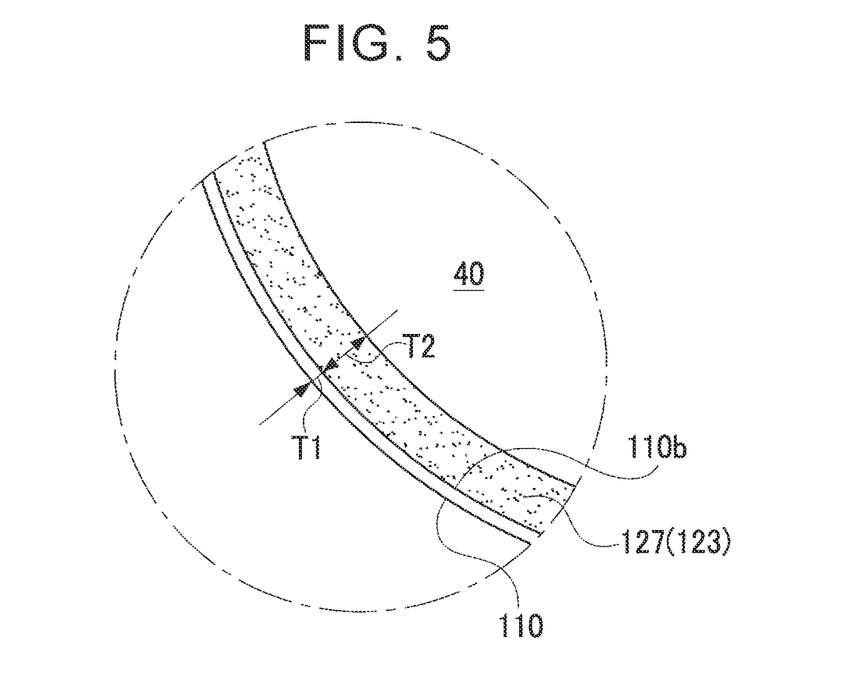
FIG. 5 is an enlarged view of a portion E in FIG. 1.

Therefore, as shown in FIG. 5, as the current collecting foil 110 on which the powder mixture 123 is arranged passes through the gap at the location where the nip roll 70 and the first hot roll 40 face each other, the powder mixture layer 127 made from the powder mixture 123 (the powder mixture layer 127 having a generally constant thickness) is formed on the first surface 110b of the current collecting foil 110. FIG. 5 is an enlarged view of a portion E in FIG. 1.

The first hot roll 40 and the second hot roll 50 are arranged so as to face each other in a vertical direction (an upper-lower direction in FIG. 1) at a position on the downstream side of the nip roll 70 in the conveyance direction DM of the current collecting foil 110. The first hot roll 40 and the second hot roll 50 face each other through a gap. Also, as shown by arrows in FIG. 1, the first hot roll 40 and the second hot roll 50 are set so that these two rolls have opposite rotation directions from each other, in other words, both of the two rolls facing each other rotate in a forward direction.

The current collecting foil 110 in which the powder mixture layer 127 made from the powder mixture 123 is arranged on the first surface 110b is made to pass through the gap at the location where the first hot roll 40 and the second hot roll 50 face each other. A dimension of the gap at the location where the first hot roll 40 and the second hot roll 50 face each other is smaller than the sum of a thickness T1 of the current collecting foil 110 and a thickness T2 of the powder mixture layer 127 (T1+T2, see FIG. 5). Further, temperature of outer peripheral surfaces of the first hot roll 40 and the second hot roll 50 is set to temperature at which the binder 122 contained in the powder mixture layer 127 softens or melts.

Therefore, as the current collecting foil 110 on which the powder mixture layer 127 is arranged is made to pass through the gap at the location where the first hot roll 40 and the second hot roll 50 face each other, hot press is performed on the current collecting foil 110 in a thickness direction. To be more specific, as the current collecting foil 110 on which the powder mixture layer 127 is arranged is made to pass through the gap at the location where the first hot roll 40 and the second hot roll 50 face each other, the powder mixture layer 127 and the current collecting foil 110 are brought into pressure contact with each other in the thickness direction (the powder mixture layer 127 is pressed towards the first surface 110b of the current collecting foil 110, and the powder mixture layer 127 is brought into pressure contact with the first surface 110b of the current collecting foil 110). At the same time, as the binder 122 contained in the powder mixture layer 127 is heated, the binder 122 softens or melts (and thus the powder mixture layer 127 becomes the negative electrode mixture layer 120).

Because of this, the particles of the negative electrode active material 121 contained in the powder mixture layer 127 are joined to each other through the binder 122, and the negative electrode mixture layer 120 made of the negative electrode active material 121 and the binder 122 is adhered to the surface (the first surface 110b) of the current collecting foil 110 through the binder 122. Thus, the negative electrode sheet 100 (the electrode sheet) is manufactured in which the negative electrode mixture layer 120 (the electrode mixture layer) made of the negative electrode active material 121 (the electrode active material) and the binder 122 without the solvent is adhered to the surface (the first surface 110b) of the current collecting foil 110.

As described so far, with the electrode sheet manufacturing device 1 according to this embodiment, the negative electrode mixture layer 120 (the electrode mixture layer) containing the negative electrode active material 121 (the electrode active material) and the binder 122 can be formed on the surface (the first surface 110b) of the current collecting foil 110 without the use of the solvent.

In a lithium ion secondary battery that is used as a driving power source for a hybrid vehicle or an electric vehicle, and so on, in order to improve a capacity density of the battery, it is required to increase a base weight (mg/cm$^2$) of the negative electrode mixture layer 120 (the electrode mixture layer) provided on the surface (the first surface 110b) of the current collecting foil 110. Therefore, when the negative electrode sheet 100 (the electrode sheet) is manufactured with the use of the electrode sheet manufacturing device 1 according to this embodiment, it is required to increase a base weight (mg/cm$^2$) of the powder mixture 123 arranged on the surface (the first surface 110b) of the current collecting foil 110.

On the contrary, in the electrode sheet manufacturing device 1 according to this embodiment continuously, the powder mixture feeding device 30 continuously feeds the powder mixture 123 into the depressed portions 11 of the gravure roll 10 in a state where circumferential speed of the gravure roll 10 (moving speed of the outer peripheral surface 10b of the gravure roll 10 in its circumferential direction due to rotation) is higher than circumferential speed of the backup roll 20 (moving speed of the outer peripheral surface 20b of the backup roll 20 in its circumferential direction due to rotation).

The first control device 81 that controls rotation of the gravure roll 10 is able to adjust the circumferential speed of the gravure roll 10. Also, the second control device 82 that controls rotation of the backup roll 20 is able to adjust the circumferential speed of the backup roll 20. Therefore, because the first control device 81 adjusts the circumferential speed of the gravure roll 10 and the second control device 82 adjusts the circumferential speed of the backup roll 20, it is possible to set a state where the circumferential speed of the gravure roll 10 is higher than the circumferential speed of the backup roll 20. For example, the circumferential speed of the gravure roll 10 may be set to be ten times higher than the circumferential speed of the backup roll 20.

By doing so, a larger amount of the powder mixture 123 can be fed onto the surface (the first surface 110b) of the current collecting foil 110 from the gravure roll 10 per a unit length of the current collecting foil 110 conveyed by the backup roll 20 in comparison to that in the case where "the powder mixture feeding device 30 continuously feeds the powder mixture 123 into the depressed portions 11 of the gravure roll 10 in a state where the circumferential speed of the gravure roll 10 and the circumferential speed of the backup roll 20 are equal to each other".

This means that, as "the powder mixture feeding device 30 continuously feeds the powder mixture 123 into the depressed portions 11 of the gravure roll 10 in a state where the circumferential speed of the gravure roll 10 is made higher than the circumferential speed of the backup roll 20", the base weight (mg/cm$^2$) of the powder mixture 123 arranged on the surface (the first surface 110b) of the current collecting foil 110 becomes larger than that in the case where "the powder mixture feeding device 30 continuously feeds the powder mixture 123 into the depressed portions 11 of the gravure roll 10 in the state where the circumferential speed of the gravure roll 10 and the circumferential speed of the backup roll 20 are equal to each other".

Therefore, with the electrode sheet manufacturing device 1 according to this embodiment, it is possible to increase the base weight (mg/cm$^2$) of the negative electrode mixture layer 120 (the electrode mixture layer) arranged on the surface (the first surface 110b) of the current collecting foil 110.

Next, a manufacturing method for the negative electrode sheet 100 according to this embodiment is described. First of all, in a powder mixture arranging step, the foregoing electrode sheet manufacturing device 1 (see FIG. 1) is used to arrange the powder mixture 123 onto the surface (the first surface 110b) of the current collecting foil 110. The powder mixture 123 is made as the powder of the negative electrode active material 121 (the electrode active material) and the powder of the binder 122 are mixed without the solvent. Specifically, the electrode sheet manufacturing device 1 has the gravure roll 10 and the backup roll 20 that rotate while facing each other, and conveys the current collecting foil 110 by using the backup roll 20 so that the current collecting foil 110 is made to pass through the gap between the gravure roll 10 and the backup roll 20. With the use of the electrode sheet manufacturing device 1, the powder mixture 123 is arranged on the surface (the first surface 110b) of the current collecting foil 110 conveyed by the backup roll 20. The powder mixture 123 is made as the powder of the negative electrode active material 121 (the electrode active material) and the powder of the binder 122 are mixed without the solvent.

More specifically, in the powder mixture arranging step, in a state where an electric potential difference is generated between the gravure roll 10 and the current collecting foil 110 conveyed by the backup roll 20, the powder mixture feeding device 30 continuously feeds the powder mixture 123 into the depressed portions 11 on the outer peripheral surface 10b of the gravure roll 10. Thus, the electric potential difference is generated between the powder mixture 123 fed into the depressed portions 11 of the gravure roll 10, and the current collecting foil 110 conveyed by the backup roll 20, and, due to the electric potential difference, electrostatic force acts between the powder mixture 123 and the current collecting foil 110.

Because of this, in the gap in the location where the gravure roll 10 and the backup roll 20 face each other, the powder mixture 123 moves (jumps) from the outer peripheral surface 10b of the gravure roll 10 to the surface (the first surface 110b) of the current collecting foil 110 due to the electrostatic force acting between the powder mixture 123 and the current collecting foil 110, and the powder mixture 123 is thus continuously arranged on the surface (the first surface 110b) of the current collecting foil 110 conveyed by the backup roll 20.

In this embodiment, the powder mixture feeding device 30 continuously feeds the powder mixture 123 into the depressed portions 11 of the gravure roll 10 in the state where the circumferential speed of the gravure roll 10 is set to be higher than the circumferential speed of the backup roll 20. Thus, a larger amount of the powder mixture 123 can be fed to the surface (the first surface 110b) of the current collecting foil 110 from the gravure roll 10 per the unit length of the current collecting foil 110 conveyed by the backup roll 20, in comparison to that in the case where "the powder mixture feeding device 30 continuously feeds the powder mixture 123 into the depressed portions 11 of the gravure roll 10 in the state where the circumferential speed of the gravure roll 10 and the circumferential speed of the backup roll 20 are equal to each other".

This means that, as "the powder mixture feeding device 30 continuously feeds the powder mixture 123 into the depressed portions 11 of the gravure roll 10 in the state where the circumferential speed of the gravure roll 10 is set to be higher than the circumferential speed of the backup roll 20", it is possible to have a larger base weight (mg/cm$^2$) of the powder mixture 123 arranged on the surface (the first surface 110b) of the current collecting foil 110 than that in the case where "the powder mixture feeding device 30 continuously feeds the powder mixture 123 into the depressed portions 11 of the gravure roll 10 in the state where the circumferential speed of the gravure roll 10 and the circumferential speed of the backup roll 20 are equal to each other".

Further, in this embodiment, prior to the powder mixture arranging step, the powder of the negative electrode active material 121 and the powder of the binder 122 are mixed with a weight ratio of 95:5 in the powder mixture fabricating step, and the powder mixture 123 is thus fabricated. Specifically, a High Speed Mixer (manufactured by Earthtechnica. Co., Ltd.) is used to mix the powder of the negative electrode active material 121 and the powder of the binder 122 so that the powder mixture 123 is fabricated.

The powder mixture 123 is made of composite particles in which particles of the negative electrode active material 121 and particles of the binder 122 are compounded (composite particles with a form in which particles of the binder 122 are bonded on surfaces of the particles of the negative electrode active material 121).

In this embodiment, rotation speed of the High Speed Mixer is set to 4000 rpm, and mixing time is set to one minute to fabricate the powder mixture 123. Also, in this embodiment, graphite powder is used as the powder of the negative electrode active material 121. Also, PVdF powder is used as the powder of the binder 122. The powder mixture 123 fabricated as described above is arranged on the surface (the first surface 110b) of the current collecting foil 110 in the powder mixture arranging step.

Next, in a powder mixture leveling step, the powder mixture 123 arranged on the surface (the first surface 110b) of the current collecting foil 110 is leveled on the first surface 110b of the current collecting foil 110. Thus, the powder mixture layer 127 with a generally constant thickness is formed. Specifically, the current collecting foil 110 on which the powder mixture 123 is arranged is conveyed in the conveyance direction DM, and passes through the gap at the location where the nip roll 70 and the first hot roll 40 face each other. Thus, the powder mixture 123 is leveled on the first surface 110b of the current collecting foil 110 and becomes the powder mixture layer 127 having a generally constant thickness (see FIG. 1 and FIG. 5).

Thereafter, in a hot press step, the current collecting foil 110 on which the powder mixture layer 127 made from the powder mixture 123 is arranged is made to pass through between the hot rolls (the first hot roll 40 and the second hot roll 50) that rotate while facing each other. Thus, while the binder 122 contained in the powder mixture 123 is softened or melted, the powder mixture 123 and the current collecting foil 110 are brought into pressure contact with each other.

Specifically, as the current collecting foil 110 having the powder mixture layer 127 is conveyed in the conveyance direction DM and made to pass through the gap at the location where the first hot roll 40 and the second hot roll 50 face each other, the powder mixture layer 127 and the current collecting foil 110 are brought into pressure contact with each other in the thickness direction (the powder mixture layer 127 is pressed towards the first surface 110b of the current collecting foil 110, and the powder mixture layer 127 comes into pressure contact with the first surface 110b of the current collecting foil 110). At the same time, because the binder 122 contained in the powder mixture layer 127 is heated, the binder 122 softens or melts.

Thus, the particles of the negative electrode active material 121 contained in the powder mixture layer 127 are joined to each other through the binder 122, and the negative electrode mixture layer 120 made of the negative electrode active material 121 and the binder 122 is adhered to the surface (the first surface 110b) of the current collecting foil 110 through the binder 122. Thus, the negative electrode sheet 100 (the electrode sheet) is manufactured in which the negative electrode mixture layer 120 (the electrode mixture layer) made of the negative electrode active material 121 (the electrode active material) and the binder 122 without a solvent is adhered to the surface (the first surface 110b) of the current collecting foil 110 (see FIG. 6).

As described above, with the manufacturing method according to this embodiment, it is possible to appropriately form the negative electrode mixture layer 120 (the electrode mixture layer) on the surface (the first surface 110b) of the current collecting foil 110 without the use of a solvent. Further, it is possible to increase the base weight (mg/cm$^2$) of the negative electrode mixture layer 120 (the electrode mixture layer) provided on the surface (the first surface 110b) of the current collecting foil 110.

The negative electrode sheet 100 fabricated as above is thereafter combined with a positive electrode sheet and a separator, and an electrode body is thus formed. Next, after a terminal member is attached to the electrode body, the electrode body and an electrolyte solution are housed in a battery case. Thus, a lithium ion secondary battery is completed.

Evaluation Tests

Next, tests were conducted in order to investigate a relation between a circumferential speed ratio (=V1/V2) that is a ratio of circumferential speed V1 (m/minute) of the gravure roll 10 and circumferential speed V2 (m/minute) of the backup roll 20, and the base weight (mg/cm$^2$) of the powder mixture 123 arranged on the surface (the first surface 110b) of the current collecting foil 110.

Specifically, first of all, as a comparative example 1, the electrode sheet manufacturing device 1 was used to manufacture an electrode sheet as the powder mixture feeding device 30 continuously fed the powder mixture 123 into the depressed portions 11 of the gravure roll 10 in a state where the circumferential speed V1 (m/minute) of the gravure roll 10 and the circumferential speed V2 (m/minute) of the backup roll 20 are equal to each other, in other words, in a state where a circumferential speed ratio=V1/V2=1. Then, a base weight (mg/cm$^2$) of the powder mixture 123 arranged on the surface (the first surface 110b) of the current collecting foil 110 (the powder mixture 123 before being leveled by the nip roll 70) was measured.

In the comparative example 1, V1=V2=3 (m/minute). Further, in the comparative example 1, the test was conducted three times under the above-mentioned conditions, and the base weight (mg/cm$^2$) of the powder mixture 123 (the powder mixture 123 before being leveled by the nip roll 70) arranged on the surface (the first surface 110b) of the current collecting foil 110 was measured in each of the tests. As a result, the base weight of the powder mixture 123 in the comparative example 1 was 1.2 (mg/cm$^2$) in the first test, 1.5 (mg/cm$^2$) in the second test, and 1.7 (mg/cm$^2$) in the third test. These results are shown in Table 1 and plotted on a coordinate plane in FIG. 7.

Further, as examples 1 to 3, the electrode sheet manufacturing device 1 was used to manufacture an electrode sheet as the powder mixture feeding device 30 continuously fed the powder mixture 123 into the depressed portions 11 of the gravure roll 10 in a state where the circumferential speed V1 of the gravure roll 10 was set to be higher than the circumferential speed V2 of the backup roll 20. Then, a base weight (mg/cm$^2$) of the powder mixture 123 (the powder mixture 123 before being leveled by the nip roll 70) arranged on the surface (the first surface 110b) of the current collecting foil 110 was measured in each of the examples.

In the example 1, V1=15 (m/minute), and V2=3 (m/minute). Therefore, the circumferential speed ratio=V1/V2=15/3=5. In the example 1, the test was conducted three times, and the base weight (mg/cm$^2$) of the powder mixture 123 (the powder mixture 123 before being leveled by the nip roll 70) arranged on the surface (the first surface 110b) of the current collecting foil 110 was measured at each of the tests. As a result, the base weight of the powder mixture 123 in the example 1 was 9.01 (mg/cm$^2$) in the first test, 7.5 (mg/cm$^2$) in the second test, and 8.8 (mg/cm$^2$) in the third test. These results are shown in Table 1 and plotted on a coordinate plane on FIG. 7.

Further, in the example 2, V1=30 (m/minute), and V2=3 (m/minute). Therefore, a circumferential speed ratio=V1/V2=30/3=10. In the example 2, the test was also conducted three times, and the base weight (mg/cm$^2$) of the powder mixture 123 (the powder mixture 123 before being leveled by the nip roll 70) arranged on the surface (the first surface 110b) of the current collecting foil 110 was measured in each of the tests. As a result, the base weight of the powder mixture 123 in the example 2 was 16.7 (mg/cm$^2$) in the first test, 17.2 (mg/cm$^2$) in the second test, and 18.1 (mg/cm$^2$) in the third test. These results are shown in Table 1 and plotted on a coordinate plane in FIG. 7.

Further, in the example 3, V1=45 (m/minute), and V2=3 (m/minute). Therefore, the circumferential speed ratio=V1/V2=45/3=15. In the example 3, the test was also conducted three times, and the base weight (mg/cm$^2$) of the powder mixture 123 (the powder mixture 123 before being leveled by the nip roll 70) arranged on the surface (the first surface 110b) of the current collecting foil 110 was measured in each of the tests. As a result, the base weight of the powder mixture 123 in the example 3 was 23.1 (mg/cm$^2$) in the first test, 25.7 (mg/cm$^2$) in the second test, and 24.9 (mg/cm$^2$) in the third test. These results are shown in Table 1, and plotted on a coordinate plane on FIG. 7.

Figure 7:
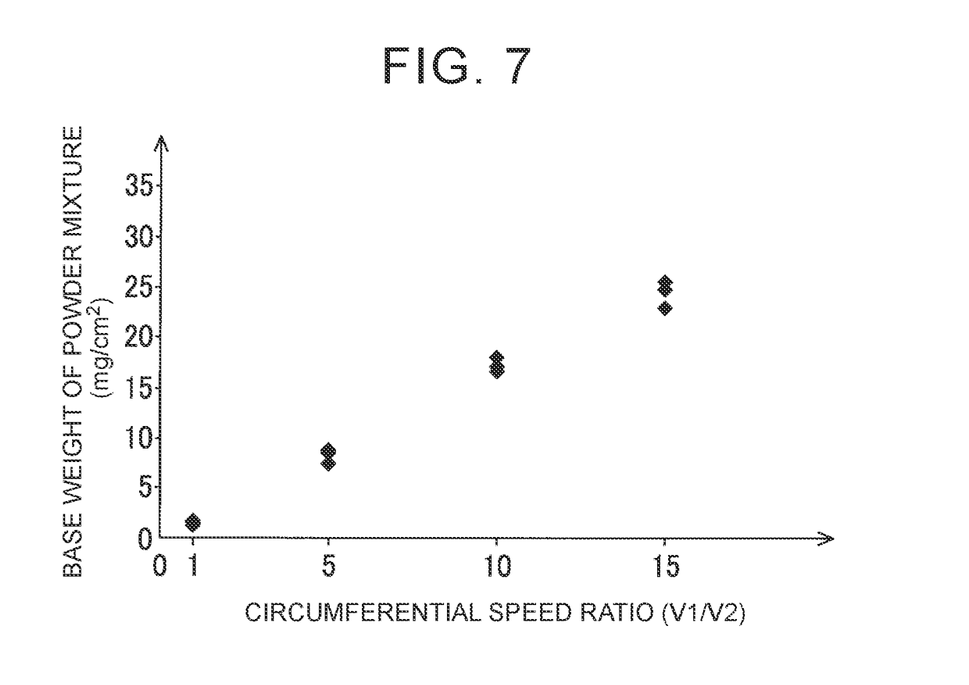
FIG. 7 is a correlation diagram of a circumferential speed ratio between the gravure roll and a backup roll, and a base weight of a powder mixture.

As shown in Table 1 and FIG. 7, in the example 1 in which the circumferential speed ratio is V1/V2=5, the example 2 in

TABLE 1

|  |  | Circumferential speed V1 of gravure roll (m/minute) | Circumferential speed V2 of backup roll (m/minute) | Circumferential speed ratio (V1/V2) | Base weight of powder mixture (mg/cm$^2$) |
|---|---|---|---|---|---|
| Comparative example 1 | First test | 3 | 3 | 1 | 1.2 |
|  | Second test | ↑ | ↑ | ↑ | 1.5 |
|  | Third test | ↑ | ↑ | ↑ | 1.7 |
| Example 1 | First test | 15 | 3 | 5 | 9.01 |
|  | Second test | ↑ | ↑ | ↑ | 7.5 |
|  | Third test | ↑ | ↑ | ↑ | 8.8 |
| Example 2 | First test | 30 | 3 | 10 | 16.7 |
|  | Second test | ↑ | ↑ | ↑ | 17.2 |
|  | Third test | ↑ | ↑ | ↑ | 18.1 |
| Example 3 | First test | 45 | 3 | 15 | 23.1 |
|  | Second test | ↑ | ↑ | ↑ | 25.7 |
|  | Third test | ↑ | ↑ | ↑ | 24.9 | which the circumferential speed ratio is V1/V2=10, and the example 3 in which the circumferential speed ratio is V1/V2=15, it is possible to have a larger base weight (mg/cm$^2$) of the powder mixture 123 arranged on the surface (the first surface 110b) of the current collecting foil 110 in comparison to that of the comparative example 1 in which the circumferential speed ratio is V1/V2=1. Specifically, in the example 1, the base weight (mg/cm$^2$) of the powder mixture 123 was increased by about five times that of the comparative example 1. In the example 2, the base weight (mg/cm$^2$) of the powder mixture 123 was increased by about 10 times that of the comparative example 1. Further, in the example 3, the base weight (mg/cm$^2$) of the powder mixture 123 was increased by about 15 times that of the comparative example 1.

Based on these results, it can be said that, as "the powder mixture feeding device 30 continuously feeds the powder mixture 123 into the depressed portions 11 of the gravure roll 10 in the state where the circumferential speed of the gravure roll 10 is set to be higher than the circumferential speed of the backup roll 20", it is possible to have a larger base weight (mg/cm$^2$) of the powder mixture 123 arranged on the surface (the first surface 110b) of the current collecting foil 110 in comparison to that in the case where "the powder mixture feeding device 30 continuously feeds the powder mixture 123 into the depressed portions 11 of the gravure roll 10 in the state where the circumferential speed of the gravure roll 10 and the circumferential speed of the backup roll 20 are equal to each other".

In other words, it can be said that, as "the powder mixture feeding device 30 continuously feeds the powder mixture 123 into the depressed portions 11 of the gravure roll 10 in the state where the circumferential speed of the gravure roll 10 is set to be higher than the circumferential speed of the backup roll 20", a larger amount of the powder mixture 123 can be fed onto the surface (the first surface 110b) of the current collecting foil 110 from the gravure roll 10 per the unit length of the current collecting foil 110 conveyed by the backup roll 20, in comparison to that in the case where "the powder mixture feeding device 30 continuously feeds the powder mixture 123 into the depressed portions 11 of the gravure roll 10 in the state where the circumferential speed of the gravure roll 10 and the circumferential speed of the backup roll 20 are equal to each other".

In the foregoing, the disclosure has been described based on the embodiment. However, the disclosure is not limited to the embodiment, and the disclosure that is changed appropriately may be applicable without departing from the gist of the disclosure.

For example, in the embodiment, the case is described in which the electrode sheet manufacturing device 1 is used for manufacturing of the negative electrode sheet 100. However, the electrode sheet manufacturing device 1 may be used so as to manufacture a positive electrode sheet. This means that the electrode sheet manufacturing device according to the disclosure is applicable not only to a device that manufactures a negative electrode sheet but also to a device that manufactures a positive electrode sheet.

Further, in the embodiment, the depressed portions of the gravure roll (a pattern) have a form in which the dimple-shaped depressed portions 11 are arranged regularly on the outer peripheral surface 10b of the gravure roll 10. However, the depressed portions of the gravure roll may have any form (pattern). For example, linear-shaped depressed portions may be formed regularly at equal intervals on the outer peripheral surface of the gravure roll.

Further, in the embodiment, the case is described in which the electrode sheet manufacturing device 1 is used so as to form the negative electrode mixture layer 120 only on one surface (the first surface 110b) of the current collecting foil 110. However, the negative electrode mixture layer 120 may be formed on both surfaces (the first surface 110b and a second surface 110c) of the current collecting foil 110. When the negative electrode mixture layer 120 is formed on both surfaces of (the first surface 110b and the second surface 110c) of the current collecting foil 110, the electrode sheet manufacturing device 1 is used so as to form the negative electrode mixture layer 120 on one surface (the first surface 110b) of the current collecting foil 110 as described above. Thereafter, the same process (the powder mixture arranging step, the powder mixture leveling step, and the hot press step) may be carried out on the second surface 110c of the current collecting foil 110 on which the negative electrode mixture layer 120 is not formed.

What is claimed is:

1. An electrode sheet manufacturing device that manufactures an electrode sheet in which an electrode mixture layer containing an electrode active material and a binder is provided on a surface of a current collecting foil, the device comprising:
   a gravure roll that has an uneven-shaped outer peripheral surface and rotates; and
   a backup roll that rotates while facing the gravure roll through a gap from the gravure roll, the backup roll allowing the current collecting foil to pass through the gap so that the backup roll conveys the current collecting foil, in which,
   in a state where an electric potential difference is generated between the gravure roll and the current collecting foil conveyed by the backup roll, powder mixture made as powder of the electrode active material and powder of a binder are mixed without a solvent is continuously fed into a depressed portion of the outer peripheral surface of the gravure roll, an electric potential difference is thus generated between the powder mixture fed into the depressed portion of the gravure roll and the current collecting foil, the powder mixture is moved onto the surface of the current collecting foil from the gravure roll due to electrostatic force acting between the powder mixture and the current collecting foil, and the powder mixture is continuously arranged on the surface of the current collecting foil conveyed by the backup roll, wherein the powder mixture is continuously fed into the depressed portion of the gravure roll in a state where circumferential speed of the gravure roll is set to be higher than circumferential speed of the backup roll.

2. The electrode sheet manufacturing device according to claim 1, further comprising a pair of hot rolls, the hot rolls rotating while facing each other through a gap, wherein the electrode mixture layer containing the electrode active material and the binder is adhered onto the surface of the current collecting foil as the current collecting foil on which the powder mixture is arranged is made to pass through the gap between the hot rolls so that the powder mixture and the current collecting foil are brought into pressure contact with each other while the binder contained in the powder mixture is being softened or melted.

3. The electrode sheet manufacturing device according to claim 2, further comprising a nip roll that is positioned on a downstream side of the backup roll and on an upstream side of the hot rolls in a conveyance direction of the current collecting foil, the nip roll leveling the powder mixture arranged on the surface of the current collecting foil.

* * * * *